3,419,544
NOVEL PREPARATION OF 1,2,3,5-TETRA-
ACYL-β-D-RIBOFURANOSES
Herbert Witzel, Marburg (Lahn), Hans Karl Maurer, Mannheim-Waldhof, and Hans-Gunter Gassen, Arnsberg, Germany, assignors to Zellstofffabrik Waldhof A.G., Mannheim-Waldhof, Germany, a corporation of Germany
No Drawing. Filed Oct. 28, 1966, Ser. No. 590,194
Claims priority, application Germany, Oct. 29, 1965, Z 11,838; Oct. 14, 1966, Z 12,473
8 Claims. (Cl. 260—234)

ABSTRACT OF THE DISCLOSURE

Process for the preparation of 1,2,3,5-tetraacyl-β-D-ribofuranoses in a simple manner.

Prior art

Nucleosides may be formed by cleavage of nucleic acids under controlled reaction conditions. These nucleosides are adenosine, guanosine, uridine and cytidine and are usually obtained in mixtures of varying amounts, depending upon the nucleic acid cleaved. The said nucleosides are used in the pharmaceutical and food industry as starting materials for adenosine-phosphate or as flavoring agents and the demand for these nucleosides as well as nucleosides which are not found in nature is increasing. To obtain nucleosides which are not naturally occurring, attempts have been made to change chemically the bases of known nucleosides, or to synthetize the desired nucleosides from a base and pentose. While the first method is only of limited usefulness, the second method has the disadvantage of the complicated production of a reactive pentose derivative for reaction with the bases.

In most cases, 1-acetyl-2,3,5-tribenzoyl-β-D-ribofuranose is a suitable pentose derivative and after conversion into the corresponding 1-halo compound, it is reacted with the mercury salt or silyl derivative of the appropriate base. The prior art method of Ness et al. (JACS, vol. 76, 1954, p. 763), of preparing 1-acetyl-2,3,5-tribenzoyl-β-D-ribofuranose started with ribose and proceeded through several steps as follows, with a yield of 50 to 70% based on the ribose:

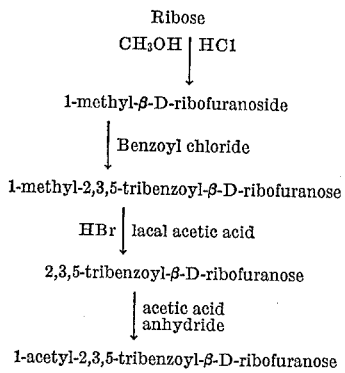

Another suitable pentose derivative that has been used is 1,2,3,5-tetraacetyl-β-D-ribofuranose which is a valuable intermediate for the synthesis of nucleosides, particularly purine and pyrimidine nucleosides which are not naturally occurring. The prior art preparation of 1,2,3,5-tetraacetyl-β-D-ribofuranose was effected by cleaving nucleic acids, nucleic acid cleavage products, particularly nucleotides and/or nucleosides to obtain ribose which was separated from the reaction mixture, purified and crystallized and the ribose was then acetylated. However, this process results in a mixture of tetraacetylated riboses exhibiting the furanose and pyranose forms of the sugar. The synthesis of natural or not naturally occurring nucleosides requires the tetraacetylated ribofuranose form and the separation of the two forms from the prior art acetylation requires expensive methods and results in considerable loss of yield.

Objects of the invention

It is an object of the invention to provide a novel process for the preparation of 1,2,3,5-tetraacyl-β-D-ribofuranoses in a high yield and a simple fashion.

This and other objects and advantages of the invention will become obvious from the following detailed description.

The invention

The novel process of the invention for the preparation of 1,2,3,5-tetraacyl-β-D-ribofuranoses comprises reacting at least one nucleoside with a solution of the organic carboxylic acid anhydride and organic carboxylic acid of 1 to 10 carbon atoms at elevated temperatures to effect cleavage of the nucleoside and simultaneous acylation to obtain 1,2,3,5-tetraacyl-β-D-ribofuranose and recovering the latter.

The nucleosides may be purine nucleosides, pyrimidine nucleosides or mixtures thereof. With purine nucleosides, the yield is 80 to 95% while somewhat lower yields are obtained from pyrimidine nucleosides alone or admixed with purine nucleosides. The latter yields are probably lower because of the prolonged reaction time required for cleavage of the pyrimidine nucleosides which results in loss of products already split off.

Examples of suitable acids used to form the tetraacyl-β-D-ribofuranoses are lower alkanoic acids of 1 to 7 carbon atoms, such as acetic acid, propionic acid, butyric acid, etc.; halogenated alkanoic acids of 2 to 7 carbon atoms such as trichloroacetic acid, trifluoroacetic acid, etc.; and aromatic acids such as benzoic acid. Other acids may also be used as long as the nucleosides are soluble therein at room temperature.

The elevated temperatures used for the reaction are preferably above 100° C. and it has proved particularly advantageous to effect the reaction at the reflux temperature of the reaction mixture.

A modification of the process of the invention comprises benzoylating at least one nucleoside, reacting the resulting benzoylated nucleoside with a solution of acetic acid and acetic anhydride at elevated temperatures to effect cleavage of the benzoylated nucleoside and simultaneous acetylation to form 1,-acetyl-2,3,5-tribenzoyl-β-D-ribofuranose and recovering the latter.

The process of the invention provides a simple means of obtaining 1,2,3,5-tetraacyl-β-D-furanoses of high purity which are useful for preparation of nucleosides in the furanose form, which are not naturally occurring. Because of the high degree of purity, they may be used directly as they are isolated from the reaction mixture, but for certain purposes, the compounds may be purified by recrystallization from an alcohol, preferably ethanol, followed by recrystallization from ether to remove the last trace of side products. By the process, cleavage products of nucleic acids and mother liquors of purine nucleosides may be used economically to synthetize nucleosides which are not naturally occurring but have great importance as carcinostatics.

Another advantage of the process of the invention resides in the fact that acylated purine bases are formed as by-products when aminopurine nucleosides such as guanosine and adenosine are used as starting materials. Until recently, these products have been made by acylation of the free base, whereas in the present process they are obtained simultaneously with the acylated β-D-ribofuranoses.

In the following examples, there are described several preferred embodiments to illustrate the invention. However, it should be understood that the invention is not intended to be limited to the specific embodiments.

Example I 50 gm. of guanosine, 200 ml. of acetic acid anhydride and 20 ml. of glacial acetic acid were refluxed for 12 hours. After being left in the refrigerator overnight, the precipitated $N^2$-acetyl-guanine was filtered off, and the filtrate obtained was evaporated to a syrup. The syrup was poured into 600 ml. of ice water, and a precipitate in flake form immediately separated. After standing for 12 hours in the refrigerator, the precipitate was suction filtered, thoroughly dried and twice recrystallized from methanol using seed crystals, to obtain 45 gm. (81% of the theory) of 1,2,3,5-tetraacetyl-β-D-ribofuranose.

Example II

Using the procedure of Example I, 50 gm. of raw guanosine, (guanosine content of about 50–55%), were subjected to cleavage and simultaneous acetylation with 500 ml. of trifluoroacetic acid anhydried and 20 ml. of trifluoroacetic acid and then purified as before to obtain 21 gm, (60–70% of theory), of 1,2,3,5-tetra-trifluoroacetyl-β-D-ribofuranose.

Example III

Using the procedure of Example I, 50 gm. of adenosine were subjected to cleavage and simultaneous acetylation with 200 ml. of acetic acid anhydried and 20 ml. of glacial acetic acid and after separation of $N^6$-acetyladenine, the product was purified to obtain 43 gm. (73% of theory) of 1,2,3,5-tetraacetyl-β-D-ribofuranose.

Example IV

Using the procedure of Example I, 50 gm. of inosine were subjected to cleavage and simultaneous acylation with 250 ml. of propionic acid anhydried and 25 ml. of anhydrous propionic acid, and after separation of the precipitated hypoxanthine, the product was purified to obtain 51 gm. (83% of theory) of 1,2,3,5-tetrapropionyl-β-D-ribofuranose.

Example V 1 liter of adenosine mother liquor, from which the major amount of adenosine and guanosine had been recrystallized, and which contained 89 gm. of adenosine, 20 gm. of guanosine, 243 gm. of uridine and 213 gm. of cytidine, was evaporated to complete dryness under vacuum of 1–2 torr. The distillation residue was taken up in a mixture of 2 liters of acetic acid anhydride and 200 ml. of glacial acetic acid and the solution was refluxed for 12 hours. After condensing the solution to ⅔ of its volume and after cooling, the precipitated, acetylpurines were filtered off and the solution was condensed to a syrup. The syrup was poured into 4–5 l. of ice water and after standing for 12 hours in the refrigerator, the resulting precipitate was vacuum-filtered, dried and recrystallized from methanol to obtain 78 gm. of 1,2,3,5-tetraacetyl-β-D-ribofuranose.

Example VI

Step A.—100 gm. of guanosine were suspended in 500 ml. of dry pyridine and the suspension was raised to reflux temperatures. While stirring, 200 ml. of benzoyl chloride were added dropwise to the suspension, which was then refluxed for 2 hours. Thereafter, pyridine and excess benzoyl chloride were distilled off under vacuum of 1–2 torr and the residual syrup was used for acetylation.

Step B.—The residue obtained in Step A was dissolved in 1000 ml. of glacial acetic acid and 500 ml. of acetic acid anhydride and the solution was refluxed for 12 hours. Then glacial acetic acid and acetic acid anhydried were distilled off under vacuum and residual acetic acid was removed by co-distillation with absolute ethanol. The residue was crystallized from 750 ml. of ethanol and after recrystallization from ether, 148 gm. (83.1% of theory), of 1-acetyl-2,3,5-benzoyl-β-D-ribofuranose were obtained in the form of mica-like lamina, having a melting point of 131–132° C.

Example VII 121 gm. of raw guanosine, the purity degree of which was determined analytically as 82.5%, were suspended in 500 ml. of dry pyridine and the suspension was raised to reflux temperatures. 200 ml. of benzoyl chloride were added dropwise to the refluxing solution and reflux was maintained for two hours. Thereafter, pyridine and excess benzoyl chloride were distilled off under vacuum of 1–2 torr, and the residual syrup was acetylated as described in Step B of Example VI to obtain 145.8 gm. (81.9% of theory) of 1-acetyl-2,3,5-benzoyl-D-ribofuranose.

Example VIII

Using the procedure of Example VII, 220 gm. of a 44.4% raw guanosine were treated to obtain 146 gm. (82% of theory), of 1-acetyl-2,3,5-benzoyl-β-D-ribufuranose.

Example IX 1.5 liters of a mother liquor, from which the principal portion of adenosine and guanosine had been recrystallized and which contained 108 gm. of adenosine, 26 gm. of guanosine, 200 gm. of uridine and 357 gm. of cytidine, were evaporated to complete dryness under vacuum at 1–2 torr. The distillation residue was suspended in 3.5 liters of dry pyridine and the suspension was raised to reflux temperature. Then, 1.4 liters of benzoyl chloride were added dropwise and with stirring, and the reaction mixture was refluxed for another 4 hours. Pyridine and excess benzoyl chloride were distilled off under vacuum of 1–2 torr and the reaction product was condensed by evaporation to syrup. The residue was dissolved in 7 liters of glacial acetic acid and 3.5 liters of acetic acid anhydride and the solution was refluxed in a reflux condenser for 18 hours. Thereafter, as in Example VI, the glacial acetic acid and the acetic acid anhydride were distilled off under vacuum, and residual acetic acid was removed by co-distillation with ethanol. The residue was recrystallized first from ethanol and then from ether, to obtain 560 gm. of 1-acetyl-2,3,5-benzoyl-β-D-ribofuranose. This yield corresponded to about 50% of the theory, if the total content of the nucleoside is taken as basis. However, the yield amounted to about 80–85%, based on the purine nucleosides actually present.

Example X 100 gm. of uridine were suspended in 500 ml. of dry pyridine and the suspension was raised to reflux temperature. While stirring, 250 ml. of benzoyl chloride were added dropwise and then the suspension was refluxed for 2 hours. Thereafter, pyridine and excess benzoyl chloride were distilled off under vacuum of 1–2 torr and the residual syrup was dissolved in 1 liter of glacial acetic acid and 500 ml. of acetic acid anhydride. The reaction mixture was refluxed for 24 hours, after which the excess glacial acetic acid and acetic acid anhydride were distilled off, as described in Example VI and the reaction product was recrystallized first from ethanol, then from ether, to obtain 98 gm. (47.6% of theory), of 1-acetyl-2,3,5-benzoyl-β-D-ribofuranose.

Example XI 100 gm. of guanosine were suspended in 500 ml. of dry pyridine and the suspension was raised to reflux temperatures. 200 ml. of benzoyl chloride were added dropwise with stirring to the suspension which was then refluxed for two hours. Then, pyridine and excess benzoyl chloride were distilled off under vacuum of 1 to 2 torr and the residue was condensed to as thick a syrup as possible. The syrup residue was dissolved in 500 ml. of chloroform and the resulting solution containing tetrabenzoyl guanosine was washed first with water, then with 1 N sulfuric acid and finally with a saturated aqueous sodium bicarbonate solution, then was dried over sodium sulfate and evaporated to dryness under vacuum. The resulting residue was then acetylated as in Step B of Example VI to obtain 169 gm. (95% of theory) of 1-acetyl-2,3,5-tribenzoyl-D-ribofuranose.

Various modifications of the process of the invention may be made without departing from the spirit or scope thereof and it is to be understood that the invention is to be limited only as defined in the appended claims.

We claim:

1. A process for the preparation of 1,2,3,5-tetraacyl-β-D-ribofuranoses which comprises reacting at least one nucleoside with a solution of the organic carboxylic acid anhydride and organic carboxylic acid of 1 to 10 carbon atoms at temperatures of about 100° C. to reflux temperatures to effect cleavage of the nucleoside and simultaneous acylation to obtain 1,2,3,5-tetraacyl-β-D-ribofuranose and recovering the latter.

2. The process of claim 1 wherein the nuceloside is the unpurified product resulting from a cleavage of a nucleic acid.

3. The process of claim 1 wherein the nucleoside is the mother liquor of a nucleic acid cleavage from which the principal portion of the purine nucleosides have been removed.

4. The process of claim 1 wherein the organic acid and organic acid anhydride are acetic acid and its anhydride.

5. The process of claim 1 wherein the organic acid and organic acid anhydride are trifluoroacetic acid and its anhydride.

6. The process of claim 1 wherein the organic acid and organic acid anhydride are propionic acid and its anhydride.

7. A process for the preparation of 1-acetyl-2,3,5-tribenzoyl-β-D-ribofuranose which comprises benzoylating a nucleoside, reacting the benzoylated nucleoside with acetic acid and acetic acid anhydride at temperatures of about 100° C. to reflux temperature to effect change of the nucleoside and simultaneous acetylation to obtain 1-acetyl-2,3,5-tribenzoyl-β-D-ribofuranose and recovering the latter.

8. The process of claim 7 wherein the reaction is effected at reflux temperatures.

References Cited

UNITED STATES PATENTS 2,827,453  3/1958  Baker et al. _____ 260—210
3,196,147  7/1965  Kiss _____ 260—209

LEWIS GOTTS, *Primary Examiner.*

J. R. BROWN, *Assistant Examiner.*

U.S. Cl. X.R.

260—210